United States Patent [19]

Cheema

[11] Patent Number: 5,757,729
[45] Date of Patent: May 26, 1998

[54] MARSH CASE

[76] Inventor: Tarsem S. Cheema, 1504 - 136 Ave SE, Calgary, Canada, AB T2J 6H3

[21] Appl. No.: 756,181

[22] Filed: Nov. 25, 1996

[51] Int. Cl.⁶ .................................................. H04R 23/00
[52] U.S. Cl. .................................... 367/188; 181/122
[58] Field of Search ........................... 367/188, 178; 181/108, 112, 122

[56] References Cited

U.S. PATENT DOCUMENTS

| | | | |
|---|---|---|---|
| 3,930,218 | 12/1975 | Hall, Jr. | 367/188 |
| 4,122,433 | 10/1978 | McNeel | 367/188 |
| 4,470,134 | 9/1984 | McNeel | 367/188 |
| 5,014,813 | 5/1991 | Fussell | 367/188 |

*Primary Examiner*—J. Woodrow Eldred
*Attorney, Agent, or Firm*—David S. Thompson

[57] ABSTRACT

An improved marsh case is disclosed. The marsh case contains and protects a geophone, which is inserted into the earth in the course of oil exploration. The marsh case provides an cap having an upper opening through which wires pass to the geophone and a lower internally threaded opening that attaches to the body of the case. The body of the case provides an upper externally threaded opening which attaches to the cap, and a lower internally threaded conical surface which allows a threaded cylindrical surface of a spike to be attached. The threads of the body are slightly tapered, thereby relieving some of the stress that would otherwise be applied to the threads. The rim of the upper external threaded opening of the body and an internal annular shoulder in the cap compress an O-ring, thereby making a water-tight seal. A quad ring seal is supported by a second internal shoulder in the cap, in a manner that firmly engages the geophone, allowing for compression of the quad ring seal in the event that the marsh case contracts due to temperature, thereby protecting the geophone from compression.

6 Claims, 3 Drawing Sheets

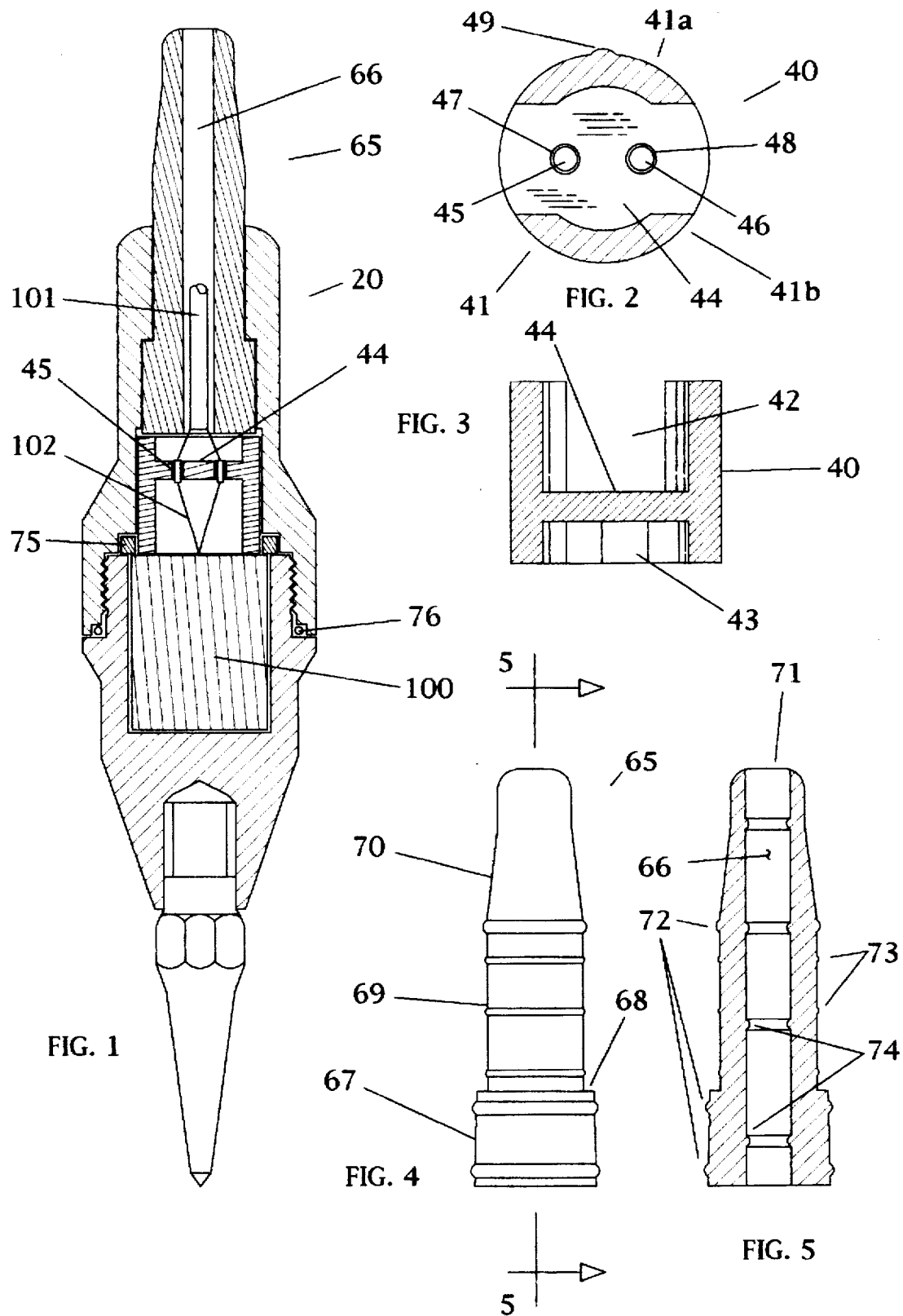

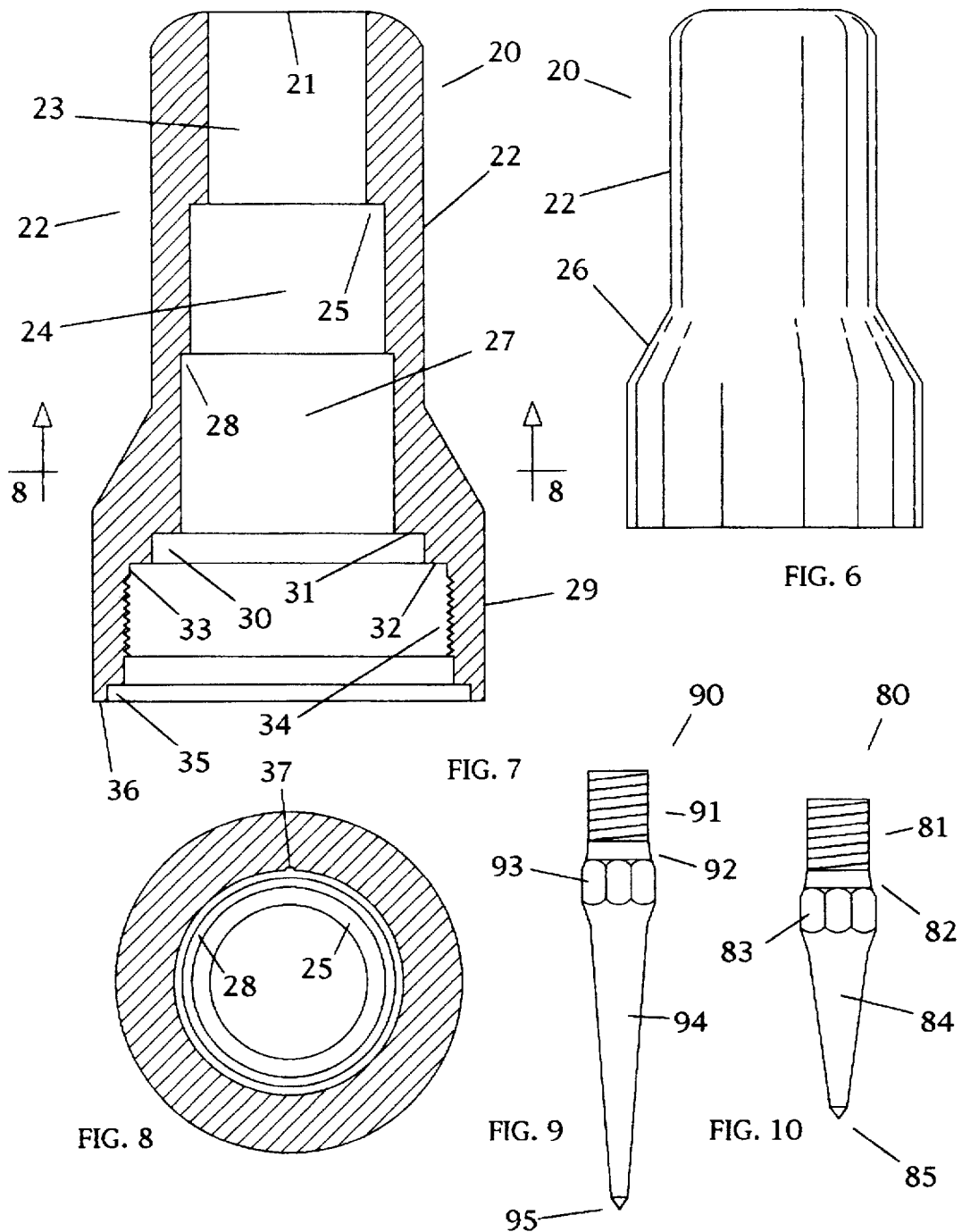

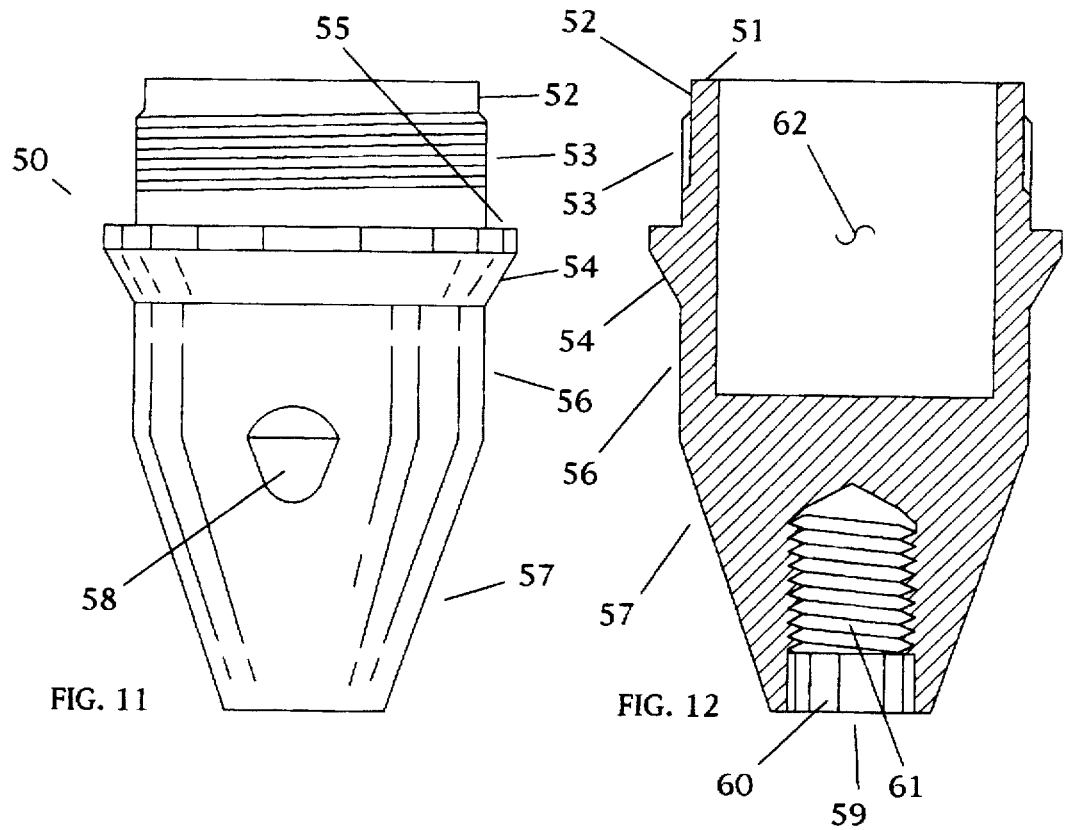
FIG. 11
FIG. 12
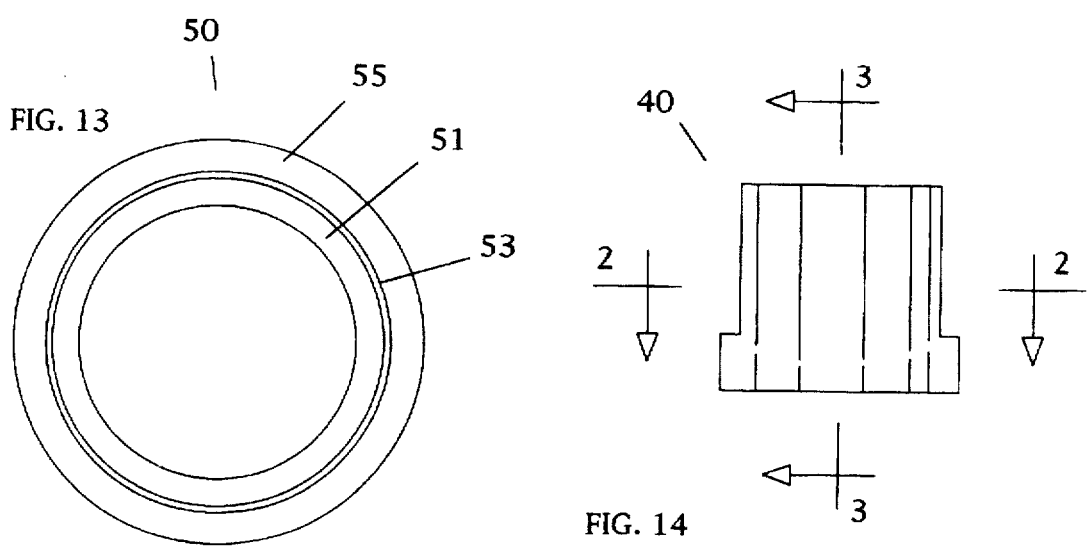
FIG. 13
FIG. 14

MARSH CASE

CROSS-REFERENCES

There are no applications related to this application filed in this or any foreign country.

BACKGROUND

A marsh case is a cylindrical device having a lower spike that is used in the course of oil exploration. Often the device is made of a non-ferrous material, but may have a lower steel spike, which assists in inserting the device into the earth. The marsh case contains an electronic device known as a geophone. The geophone senses vibrations below the ground surface resulting from deliberately set explosives, and then relays that information to computers above the ground surface. The marsh case must protect the geophone when both are inserted into hard or soft ground, under water or in marshes.

A problem in the design of known marsh cases results in the breakage of the spike or in the stripping of the threads used to attach the spike to the case body. The spike is particularly vulnerable, in many known marsh cases, in the area of the threads. A lock washer is typically used in the attachment of the threaded spike, in effort to prevent the spike from loosening during movement. This solution is often unsatisfactory.

A further design flaw in many marsh cases involves structures that allow too much movement of the sensing wire inside the case. Over time this causes metal fatigue that results in breakage and electrical discontinuities.

A still further design flaw is that many marsh cases have made no structural adaptations to accommodate for material expansion and contraction due to temperature changes. In extreme environments, this can cause the marsh case to compact the geophone to the point of malfunction, or can result in motion by the geophone within the case resulting in false readings from to the geophone.

Another point of weakness in many marsh cases is the threaded attachment between the upper and lower case members. Thread stripping, case fracture and water leakage in this area are all typical problems with known marsh cases.

What is needed is an improved marsh case that better protects the encased geophone. The marsh case should provide additional protection to the spike, and should have structures that are less susceptible to breakage. The marsh case should have means for reducing movement of the geophone in order to eliminate false readings. The marsh case should provide means for accommodating the interior dimensions of the case to the geophone, even during temperature extremes. Moreover, the marsh case should provide a better connection between the upper and lower portions of the case, resulting in improved strength and greater water leakage protection.

SUMMARY

The improved marsh case of the present invention provides some or all of the following structures.

(a) A body, typically formed from aluminum, provides an internal geophone chamber. A threaded surface on an upper portion allows attachment to a cap. A spike attachment socket having an internally threaded slightly conical surface in a tapered nose portion of the body allows attachment of a spike.

(b) A cap having a threaded lower surface may be attached to the body, thereby sealing the geophone within the marsh case. The cap provides a stress anchor chamber adjacent to the geophone chamber. An annular quad ring seal chamber is adjacent to the body, the stress anchor chamber and the geophone chamber. The cap also provides a grommet chamber adjacent to the stress anchor chamber.

(c) Differently sized spikes having a threaded cylindrical surface on their upper ends may be threadedly carried by the body. The cylindrical surface on which the threads are carried, is threaded into the slightly conical threads of the spike attachment socket. This combination tends to reduce the stress on the threads, and eliminates the need for a lock washer.

(d) A soft rubber grommet is carried by the cap in the grommet chamber, and serves to protect wires communicating with the geophone. O-rings prevent water from entering the marsh case.

(e) A stress anchor is carried in the stress anchor chamber of the cap. The stress anchor provides continuous even pressure on the geophone and receives continuous even pressure from the grommet. The stress anchor prevents metal fatigue in the wiring to the geophone by preventing its movement.

(f) A quad ring seal is carried by the annular quad ring seal chamber of the cap and performs a sealing function between the cap and the body and also between the body and the geophone. The quad ring seal additionally provides pressure against the geophone, keeping it in place and also adjusting to prevent damage to the geophone where temperature causes the cap and body to change size.

(g) An O-ring, carried adjacent to the cap and the body, also prevents the entrance of moisture.

(h) Optionally, a thin film of adhesive may be used to increase the bond between the threads connecting the cap and the body. Mating surfaces, adjacent to the threads of the body and the cap are sized to allow a thin film of adhesive to be present between the cap and body, thereby increasing the bond between the two.

It is therefore a primary advantage of the present invention to provide a novel marsh case for housing a geophone having a threaded slightly conical surface within a spike attachment socket for connecting to the cylindrically threaded spike. The use of a threaded conical surface within the spike attachment socket tends to prevent stripping and shearing of the threads, eliminates the need for a locking washer and tends to ensure that the spike does not release during insertion into the ground.

Another advantage of the present invention is to provide a novel marsh case for housing a geophone having superior resistance to thermal expansions and contractions, having means to prevent crushing pressure being applied to the geophone during contractions, and leakage resulting in electrical shorts and movement resulting in metal fatigue and damage when the case expands due to increased temperature.

A still further advantage of the present invention is to provide a novel marsh case for housing a geophone having slightly recessed solid mating surfaces available for carrying a thin coating of adhesive adjacent to the threads connecting the cap and body, thereby creating a superior moisture barrier and seal.

DRAWINGS

These and other features, aspects, and advantages of the present invention will become better understood with regard

3 to the following description, appended claims, and accompanying drawings where:

FIG. 1 is a cross-sectional view of a version of the marsh case of the invention, having a geophone installed;

FIG. 2 is a cross-sectional view of the stress anchor of FIG. 14, taken along the 2—2 lines;

FIG. 3 is a cross-sectional view of the stress anchor of FIG. 14, taken along the 3—3 lines;

FIG. 4 is side orthographic view of the grommet carried by the cap of the marsh case of FIG. 1, showing the external details of its construction;

FIG. 5 is a cross-sectional view of the grommet of FIG. 4, taken along the 5—5 lines;

FIG. 6 is a side orthographic view of the cap of the marsh case seen in FIG. 1;

FIG. 7 is an enlarged cross-sectional view of the cap of FIG. 6;

FIG. 8 is a cross-sectional view of the cap of FIG. 7, taken along the 8—8 lines;

FIG. 9 is a side orthographic view of a long spike, usable with the version of the marsh case seen in FIG. 1;

FIG. 10 is a side orthographic view of a short spike, usable with the version of the marsh case seen in FIG. 1;

FIG. 11 is a side orthographic view of body of the body of the marsh case of FIG. 1;

FIG. 12 is a cross-sectional view of the body seen in FIG. 11;

FIG. 13 is a top view of the body seen in FIG. 11, as seen from the top; and

FIG. 14 is a side orthographic view of the stress anchor.

DESCRIPTION

Referring in particular to FIG. 1, an improved marsh case 10 constructed in accordance with the principles of the invention is seen. The marsh case 10 provides a cap 20 and a body 50 that are threadedly connected. The body provides a chamber suitable for housing a geophone 100 in a secure manner. Either a short spike 80 or a long spike 90 is attached to the body, allowing the marsh case to be inserted into the ground. The cap provides adjacent chambers for housing a stress anchor 40, in contact with the geophone, and a grommet 65, which protects the wiring of the geophone.

Referring in particular to FIGS. 1, 11, 12 and 13, a hollow body 50 is formed from aluminum, partially enclosing a geophone chamber 62. In the preferred embodiment the body 50 has an overall length of 2.5 inches and a width of 1.31 inches. The body 50 has an annular upper rim 51 which is sized to mate with an annular seat 32 of the cap 20. Adjacent to the upper rim 51 is an upper mating surface 52 which forms a narrow annular cavity against cap 20, where adhesive may be used, if desired, to create a stronger bond between the cap 20 and body 50. In the preferred embodiment, threaded surface 53, adjacent to the upper mating surface 52, provides 1⅛"-16 UNF external threads, which are much finer for this diameter than the standard 1⅛"-12 UNF threads typically associated with threaded fasteners of similar diameter. Adjacent to the threaded surface 53 is an annular flare 54, which extends radially from the body. The annular flare 54 forms an annular upper shoulder 55 on its upper surface. The annular upper shoulder 55 is sized to mate and provide a tight seal with the lower rim 36 of the cap 20. Adjacent to the annular flare 54 is a cylindrical body portion 56. A tapered nose portion 57, adjacent to the cylindrical body portion 56, provides

4 opposed wrench cutouts 58. The tapered nose portion terminates in a spike attachment socket 59 having a short internal channel 60 and a threaded very slightly conical surface 61, which mates with the threaded cylindrical surface 81, 91 of the upper end of either spike 80, 90. The threaded conical surface 61 is typically tapered at the rate of ¾" per foot, NTP. The taper of the threaded conical surface 61 results in less shearing forces on the threads, and less likelihood of damage of the spike or body. A locking washer is not required, due to this design.

As seen particularly in FIGS. 1, 6, 7, and 8, a cap 20 is releasably attachable to the body 50 by means of a threaded connection. An upper cylindrical body portion 22 having an upper hole 21 defines an axial channel 23, a grommet chamber 24 and a stress anchor chamber 27. The grommet chamber 24 provides an annular grommet support shoulder 25. A flared body portion 26, adjacent to the upper cylindrical body portion 22, defines the stress anchor chamber 27 and a stress anchor seat 28. A lower cylindrical body portion 29, adjacent to the flared body portion 26, provides an inner surface defining a quad ring seal chamber 30 and a quad ring seal seat 31. An annular seat 32, adjacent to the quad ring seal chamber, is sized to mate with the annular upper rim 51 of the body 50. An adhesive mating surface 33 is adjacent to the annular seat 32, and allows the application of an adhesive immediately prior to attachment of the cap 20 and the body 50. The adhesive mating surface provides a narrow annular ring where a thin film of adhesive may be allowed to harden after the cap and body are threaded together, thereby making a very strong bond between the two. An internal threaded surface 34, adjacent to the adhesive mating surface, is sized to mate with the threaded surface 53 of the body 20. In the preferred embodiment, the thread size is 1⅛"-16 UNF, considerably finer than the 1⅛"-12 UNF that is commonly used. An O-ring seat 35, adjacent to the threaded surface 34, is sized to accept an O-ring, which provides a moisture-tight seal. A rim 36, adjacent to the O-ring seat, is sized to mate with the annular upper shoulder 55 of the body 50 when the cap and body are connected. A key notch 37, defined on an inside surface of the flared body portion 26 engages the key 49 of the stress anchor 40, as will be seen, preventing rotation of the stress anchor, and therefore twisting of the wiring 101 associated with the geophone 100, when the cap and body are threaded together.

A soft rubber grommet 65 defining an axial chamber 66 is carried by the grommet chamber 24 of the cap 20. The axial chamber 66 provides a passageway for wiring 101 of the geophone to exit from the marsh case 10. The grommet functions to reduce the stress on the wiring 101 of the geophone 100, and also to provide a more moisture resistant seal in the upper hole 21 of the cap. The grommet may be made of stiff but slightly flexible plastic, rubber or similar synthetic material. The grommet 65 generally provides a lower cylindrical body 67 having a shoulder 68. The shoulder 68 is sized to mate with the grommet support shoulder 25 of the cap 20. The interaction between the grommet shoulder 68 and support shoulder 25 prevents the grommet from being removed from the marsh case by means of upper hole 21. The grommet also provides an upper cylindrical body 69, adjacent to the lower cylindrical body 67. The diameter of the upper cylindrical body 69 is slightly less than the diameter of the lower cylindrical body 67. Adjacent to the upper cylindrical body, a tapered end 70 provides an upper opening 71. Large O-rings 72, small O-rings 73 and internal O-rings 74 all contribute to a tighter seal.

A stress anchor 40, formed of hard plastic and carried in the stress anchor chamber 27 of the cap 20, keeps the geophone 100 securely in place and secures the rat-tail wires 102 exiting the geophone. The grommet 65 tends to apply a slight pressure on the stress anchor 40, which in turn applies a slight pressure on the geophone. The stress anchor provides a hollow partially cylindrical body 41 having a first and second portion 41a, 41b; the body defining an upper cavity 42 and a lower cavity 43 separated by a floor 44. The floor is carried by the cylindrical body and defines first and second rat-tail holes 45, 46. The rat-tail holes allow the rat-tails 102 to pass through the floor 44. First and second brass inserts 47, 48, are carried by the first and second rat-tail holes, thereby providing a surface that is not adversely effected by solder, which is used to make the electrical connection between the wiring 101 and the rat-tails 102. A key 49, defined on an external surface of the hollow and otherwise cylindrical body 41, and sized to engage key notch 37 of the cap 20, prevents any rotation of the stress anchor which might otherwise occur when the cap and body are threaded together.

A quad ring seal 75 is carried by the annular quad ring seal chamber 30 of the cap 20, thereby sealing between the cap and the body, and additionally providing pressure against the geophone, keeping the geophone immobile. The quad ring seal 75 is made of a material that is resiliently compressible. The resilient compressibility quality prevents damage to the geophone where temperature causes the cap and body to contract. In this circumstance, pressure by the geophone against the quad rind seal would cause the quad ring seal to compress, thereby reducing stress on the geophone. This resilient quality also prevents damage to the geophone where temperature causes the cap and body to expand. In this circumstance, the quad ring seal would expand slightly, causing a continuous gentle pressure against the geophone, preventing the geophone from moving within the geophone chamber 62, which could damage the electronics contained within the geophone.

An O-ring 76, carried by the O-ring seat 35 of the cap 20, prevents moisture from entering the marsh case.

Either of two spikes 80, 90 are releasably carried by the body 50. A short spike 80 and a long spike 90 are similarly constructed typically of aluminum compatible zinc plated steel. A threaded cylindrical surface 81, 91 on the upper end of each spike is engageable with the threaded conical surface 61 of the spike attachment socket 59 of the tapered nose portion 57 of the body 50. Each spike carries wrench flats 83, 93, separated by a narrow cylindrical section 82, 92 from the threaded cylindrical surface on the upper end, for use with a wrench in turning the spike relative to the body 50. Each spike provides a conical body 84, 94, adjacent to the wrench flat, having a lower tip 85, 95. The overall length of the short spike it typically 2", from the tip, up to and including, the wrench flats. The overall length of the long spike is typically 3".

To use the marsh case, the geophone is inserted into the geophone chamber, allowing for the wiring to exit through the axial channel 66 of the grommet 65 and for the rat-tails to be soldered onto the brass inserts 47, 48 of the stress anchor 40. The wiring 101 is soldered to the rat-tails 102, which are carried by the brass inserts 47, 48. A thin film of adhesive glue may be spread, if desired, on the threaded surfaces 34, 53 of the cap and body. The cap is then threaded onto the body, causing the adhesive to collect on mating surfaces 33, 52, where it hardens. As the cap and body are threaded together, the stress anchor is prevented from rotation by key 49 and key notch 37. Quad ring seal 75 and grommet 65 are compressed slightly, applying a slight pre-load pressure to the geophone. The wrench cutouts may be used to tighten the body against the cap. The spike is then threaded into place, using the wrench flats 83, 93 on the spike along with the wrench cutouts 58 on the body to deliver about 50 lbs. of torque. At the same time that the spike is being tightened, the cap and body are tightened. During the tightening of the spike and the marsh case, the top portion of the case may be held in a V-shaped device so that torque can be applied to tighten the case.

The previously described versions of the present invention have many advantages, including a primary advantage of providing a novel marsh case for housing a geophone having a threaded slightly conical surface within a spike attachment socket for connecting to the cylindrically threaded spike. The use of a threaded conical surface within the spike attachment socket tends to prevent stripping and shearing of the threads, eliminates the need for a locking washer and tends to ensure that the spike does not release during insertion into the ground.

Another advantage of the present invention is to provide a novel marsh case for housing a geophone having superior resistance to thermal expansions and contractions, having means to prevent crushing pressure being applied to the geophone during contractions, and leakage resulting in electrical shorts and movement resulting in metal fatigue and damage when the case expands due to increased temperature.

A still further advantage of the present invention is to provide a novel marsh case for housing a geophone having slightly recessed solid mating surfaces available for carrying a thin coating of adhesive adjacent to the threads connecting the cap and body, thereby creating a superior moisture barrier and seal.

Although the present invention has been described in considerable detail and with reference to certain preferred versions, other versions are possible. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A marsh case for enclosing a geophone, comprising:
A) a body, partially enclosing a geophone chamber, additionally comprising:
  (a) an annular upper rim, defined in a cylindrical body portion of the body;
  (b) a threaded surface adjacent to the annular upper rim;
  (c) a tapered nose portion, adjacent to the cylindrical body portion, defining opposed wrench cutouts; and
  (d) the tapered nose portion terminating in a spike attachment socket having a threaded conical surface;
B) a cap, releasably attachable to the body, comprising:
  (a) a threaded surface, defined on a lower cylindrical body portion, sized to mate with the threaded surface of the body; and
  (b) an O-ring seat, adjacent to the threaded surface, sized to accept an O-ring; and
C) a spike, releasably carried by the body, comprising:
  (a) an upper end having a threaded cylindrical surface, engageable with the threaded conical surface of the spike attachment socket of the tapered nose portion;

(b) wrench flat means, adjacent to the threaded conical surface, for turning the spike relative to the body; and (c) a body, adjacent to the wrench flat means, having a lower tip.

2. The marsh case of claim 1, further comprising a grommet defining an axial chamber, carried by a grommet chamber defined in the cap, the grommet further comprising:

(a) a lower cylindrical body having a shoulder, the shoulder sized to mate with a grommet support shoulder defined by the cap;

(b) an upper cylindrical body, adjacent to the lower cylindrical body; and (c) a tapered end having an upper opening, adjacent to the upper cylindrical body.

3. The marsh case of claim 1, wherein the cap defines a stress anchor chamber and a key notch, and wherein the marsh case further comprises a stress anchor, carried in the stress anchor chamber defined in the cap, the stress anchor further comprising:

(a) a hollow cylindrical body defining an upper and a lower cavity separated by a floor, wherein the floor is carried by the cylindrical body and defines at least one hole; and (b) a key, defined on an external surface of the hollow cylindrical body, sized to engage the key notch of the cap.

4. The marsh case of claim 1, further comprising a quad ring seal carried by an annular quad ring seal chamber defined in the cap, thereby sealing between the cap and the body, and additionally providing pressure against the geophone, keeping the geophone immobile, wherein the quad ring seal is made of a material suitably resiliently compressible, thereby preventing damage to the geophone where temperature causes the cap and body to contract or expand.

5. The marsh case of claim 1, further comprising O-ring means, carried by the O-ring seat defined in the cap, for preventing the entrance of moisture.

6. A marsh case for enclosing a geophone, comprising:

A) a body, partially enclosing a geophone chamber, additionally comprising:

(a) an annular upper rim;

(b) an upper mating surface, whereby adhesive may be applied promoting a better seal, adjacent to the annular upper rim;

(c) a threaded surface adjacent to the upper mating surface;

(d) an annular flare extending radially from the body adjacent to the threaded surface, the annular flare having an annular upper shoulder;

(e) a cylindrical body portion, adjacent to the annular flare;

(f) a tapered nose portion, adjacent to the cylindrical body portion, defining opposed wrench cutouts; and (g) the tapered nose portion terminating in a spike attachment socket having a threaded conical surface;

B) a cap, releasably attachable to the body, comprising:

(a) an upper cylindrical body portion having an upper hole, the upper cylindrical body portion defining a grommet chamber and a grommet support shoulder;

(b) a flared body portion, adjacent to the upper cylindrical body portion defining a stress anchor chamber and a stress anchor seat;

(c) a lower cylindrical body portion, adjacent to the flared body portion, having an inner surface defining a quad ring seal chamber and a quad ring seal seat;

(d) an annular seat, adjacent to the quad ring seal chamber and sized to mate with the annular upper rim of the body;

(e) an adhesive mating surface adjacent to the annular seat;

(f) a threaded surface, adjacent to the adhesive mating surface, sized to mate with the threaded surface of the body;

(g) an O-ring seat, adjacent to the threaded surface, sized to accept an O-ring;

(h) a rim, adjacent to the O-ring seat, sized to mate with the annular upper shoulder of the body; and (i) a key notch, defined in the flared body portion;

C) a spike, releasably carried by the body, comprising:

(a) an upper end having a threaded cylindrical surface, engageable with the threaded conical surface of the spike attachment socket of the tapered nose portion;

(b) wrench flat means, adjacent to the upper end having a threaded conical surface, for turning the spike relative to the body; and (c) a conical body, adjacent to the wrench flat means, having a lower tip;

D) a grommet defining an axial chamber, carried by the grommet chamber, comprising:

(a) a lower cylindrical body having a shoulder, the shoulder sized to mate with the grommet support shoulder of the cap;

(b) an upper cylindrical body, adjacent to the lower cylindrical body;

(c) a tapered end having an upper opening, adjacent to the upper cylindrical body; and (d) at least one O-ring, defined on a surface portion of the grommet for contributing to a tighter seal:

E) a stress anchor, carried in the stress anchor chamber of the cap, comprising:

(a) a hollow cylindrical body defining an upper cavity and a lower cavity separated by a floor, wherein the floor is carried by the cylindrical body and defines a first rat-tail hole and a second rat-tail hole;

(b) first and second brass inserts, carried by the first and second rat-tail holes; and (c) a key, defined on an external surface of the hollow cylindrical body;

F) a quad ring seal is carried by the annular quad ring seal chamber of the cap, thereby sealing between the cap and the body, and additionally providing pressure against the geophone, keeping the geophone immobile, wherein the quad ring seal is made of a material suitably resiliently compressible, thereby preventing damage to the geophone where temperature causes the cap and body to expand or contract; and G) O-ring means, carried by the O-ring seat of the cap, for preventing the entrance of moisture.

* * * * *